SUPERCONDUCTIVE VARIABLE IMPEDANCE ELEMENT

Filed Dec. 30, 1963 2 Sheets-Sheet 1

INVENTOR.
WILLIAM R. KRAFFT,
BY J. K. Haskell
ATTORNEY.

SUPERCONDUCTIVE VARIABLE IMPEDANCE ELEMENT

Filed Dec. 30, 1963 2 Sheets-Sheet 2

INVENTOR.
WILLIAM R. KRAFFT,
BY J. K. Haskell
ATTORNEY.

3,257,587
Patented June 21, 1966

3,257,587

SUPERCONDUCTIVE VARIABLE IMPEDANCE ELEMENT

William R. Krafft, Los Angeles, Calif., assignor to Hughes Aircraft Company, Culver City, Calif., a corporation of Delaware Filed Dec. 30, 1963, Ser. No. 334,335
8 Claims. (Cl. 317—158)

This invention relates to a variable impedance element and more particularly to a variable impedance element for operation at cryogenic temperatures.

In high performance radio communications systems, it is often desirable to locate powerful transmitters physically near sensitive receivers. Present receiver design limits the minimum spacing of receiver and transmitter due to the inability of the receiver to handle two signals of widely differing strengths without intermodulation of one signal on the other. The typical problem is one of receiving, without interference, a signal of a few microvolts while very closely located with respect to a multi-kilowatt transmitter on a closely spaced adjacent channel.

The requirements for a receiver to successfully operate under these conditions include a front end or RF circuit which contains no nonlinear elements prior to the detector and which affords the many db of attenuation of the unwanted strong signal without loss of the weaker desired signal. Present-day designs utilizing inductance and capacitance in various circuits are unable to achieve this performance and as a consequence, most designs consist of a low gain front end with some automatic gain control (A.G.C.) followed by a detector and a crystal filter with most of the amplification taking place after the filter. A very careful design is necessary to achieve good noise figure and reasonable dynamic range but due to the inclusion of nonlinear amplifying and detector elements in the front end design, true wide dynamic range of the order of 100 db is not possible.

In seeking a solution to the problem noted above, the field of superconducting circuits has been investigated. Because of the loss of all resistance in superconducting materials, electrical circuits constructed from components made from such materials exhibit extremely high values of Q. Values of Q on the order of 100,000 have been measured in cryogenic resonant circuits and it is apparent that even higher values can be obtained (see "Superconductive Frequency Control Devices," Report No. 4, Electronic Materials Research Laboratory, University of Texas, EMRL Report No. 117, 1962).

The Q of a resonant circuit determines its effectiveness in an oscillator, filter, or other frequency-sensitive circuit. The use of superconductors permits lumped circuit components to have values of Q comparable to quartz crystals and cavity resonators in ultra high frequency and microwave regions.

Although in the past most of the work in this area has been concerned with fixed tuned circuits, some efforts have been extended toward variable frequency resonators. advantageous processes. The first is to mount a conventional variable air capacitor in parallel with a superconducting inductor completely within a liquid helium environment. A long linkage from the capacitor to the operator's environment is necessary in order to vary the capacitance. Unless elaborate precautions are taken, the formation of ice or solid air will cause freezing of the tuning rod and capacitor plates to other parts of the system. Also, the tuning rod acts as a large thermal path from outside the dewar causing a more rapid boil-off of valuable liquid helium.

The second method consists of mounting the variable capacitor externally to the liquid helium dewar to eliminate the problem of freezing. This method necessarily reduces the Q since much of the wiring is not in the superconducting state.

The present invention overcomes the above-mentioned disadvantages in a variable impedance element operating in a cryogenic environment.

Accordingly, it is an object of the present invention to provide an improved variable impedance element having no moving parts for operation at cryogenic temperatures.

It is another object of the invention to provide a variable impedance element which does not require apparatus of special design to prevent freezing of moving parts.

It is still another object of the present invention to provide a variable impedance element which eliminates the need of a large thermal path from outside the cryogenic system while maintaining the high Q of the superconducting circuits.

These and other objectives are achieved, according to the invention, in a variable impedance element which comprises a superconductive material which exhibits a significant resistance value at a temperature below a critical temperature only in the presence of a magnetic field in excess of a critical value. An adjustable magnetic field producing means is also utilized and is coupled to the superconductive material for providing in at least a predetermined portion of the material a magnetic field strength in excess of the critical value to effect a change in the impedance of the variable impedance element.

The invention and specific embodiments thereof will be described hereinafter by way of example and with reference to the accompanying drawings, in which.

The principles and operation of the invention will be made with reference to the drawings, where like reference numerals indicate like components.

Figure 1A:
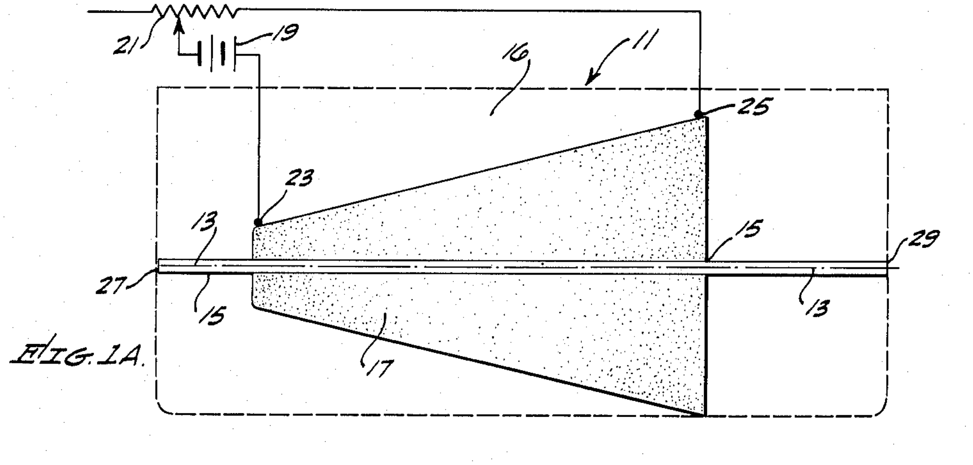
FIG. 1A is a schematic diagram of a variable resistor illustrating one embodiment of the present invention.
Figure 1B:
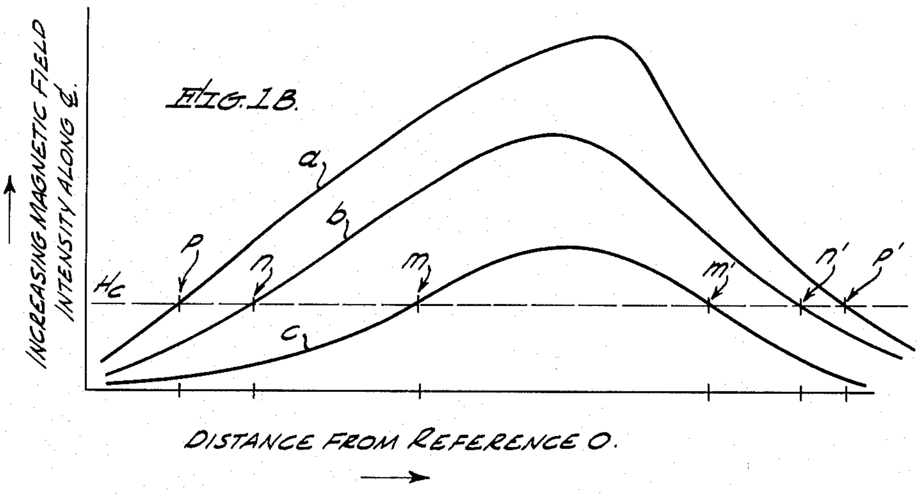
FIG. 1B is a graph showing how different portions of a superconducting material may be switched out of a superconducting state by the application of a nonuniform magnetic field.

Referring now to the drawings, and more particularly to FIG. 1A, there is shown a variable resistor element 11 having a longitudinal insulated cylinder 13 coated with a thin film 15 of a material which exhibits a significant resistance value at a temperature below a critical temperature $T_c$ only in the presence of a magnetic field in excess of a critical value $H_c$. Liquid helium may be pumped into a thermally insulated system 16 such as a Dewar flask with the variable impedance element immersed therein to provide the necessary temperature. These cryogenic systems are well known in the art and will not be discussed in detail here. The magnetic field is provided in this embodiment by a solenoid multilayer magnetic field coil 17 mounted coaxially on the insulated cylinder 13. The coil 17 is wound such that the magnetic field intensity at the center varies from a minimum to a larger value along the cylinder 13. This is illustrated in FIG. 1B for various field intensities. Of course, any other magnet configuration providing a similar field strength pattern may be utilized.

The field coil 17 is energized by means of a source of electrical energy illustrated as a battery 19 coupled through a variable resistor 21 to two terminals 23 and 25 of the coil 17. By adjusting the adjustable resistor 21, the current flowing through the field coil 17 is varied and thus any desired field strength between zero and a predetermined maximum may be obtained. Three such field intensities *a*, *b*, and *c* are illustrated as an example in FIG. 1B.

Due to the particular type of winding configuration, the magnetic field intensity is not uniform along the thin film coated cylinder 13. Thus, for reasons to be more fully explained later, at some location *m* with field excitation level $H_c$, the material 15 will be switched to a non-superconductive state in that length of the coated cylinder 13 between points *m* and *m'* where at the field intensity exceeds the critical value $H_c$. For increased fields, the critical switchover point moves from *m–m'* to *n–n'* and finally to *p–p'*.

The resistance of the device of FIG. 1A as measured between terminals 27 and 29, and can be increased smoothly from zero to some maximum value established by the thinness of the film 15, the diameter of the cylinder 13 and the resistivity of the particular film material used.

A brief description of the basic principles involving the invention follows, but for a more complete dissertation on the subject, reference may be made to the literature such as an article, "Superconductivity," by Randall F. Barron in Machine Design, February 15, 1962, pages 24–28, and March 1, 1962, pages 24–28.

When a number of common metals and many metallic alloys are reduced in temperature to values a few degrees above absolute zero, they suddenly assume different electrical and magnetic properties. Electrically, they become superconductors enabling them to conduct electrical currents with essentially zero resistance, while at the same time they become diamagnetic to the extent they resist essentially any penetration of a magnetic field.

If an external magnetic field of sufficient strength is applied to a superconductor, the diamagnetic properties are overcome and the metal is driven out of superconductivity into a state which has all the normal characteristics at the cryogenic temperature. It has been found that a resistor can be fabricated from such a material by evaporating a thin film of the metal on a suitable dielectric substrate. The dimensions of the film can be arranged to give a high normal-state resistance.

The entire resistor can be put into the superconducting state and switched in and out of the normal state by the application of an external magnetic field of sufficient strength.

However, in accordance with the invention, if instead of subjecting the entire film to the magnetic field greater than the critical field—the film is placed in a field of high gradient, as shown in FIG. 1A for example, the portion of the film subjected to a field of intensity less than the critical field will remain superconducting. The normal region will be limited to the area of the film subjected to fields greater than the critical fields for the film. By varying the strength of the applied magnetic field, the normal area and therefore the resistance can be controlled.

Figures 2, 6:
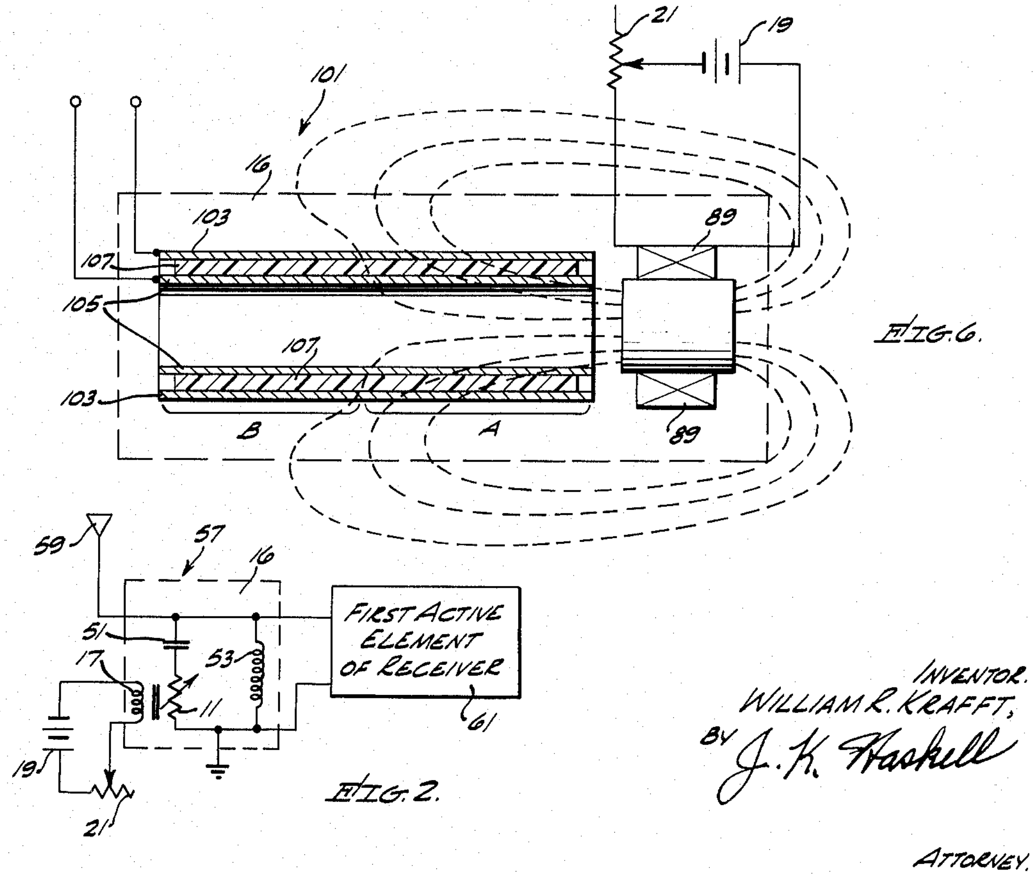
FIG. 2 is a schematic circuit diagram indicating one possible use for the variable resistor of FIG. 1A.
FIG. 6 is an illustration of a variable capacitor according to the invention.

The device of FIG. 1A can be advantageously used as a smooth de-Q circuit which allows the adjustment of the selectivity of a superconducting tuned circuit without disturbing the tuned elements. Such an application is illustrated in FIG. 2 where the variable resistance element 11 is connected in series between a superconducting fixed tuning capacitor 51 and a superconducting fixed tuning inductor 53, all disposed in a cryogenic bath 16 of liquid helium (approximately 4.2° K.), for example. The superconducting tuned circuit 57 is connected between an antenna 59 and the first active element 61 in a superheterodyne receiver (not shown). The variable resistance element 11 is controlled by the adjustable resistor 21 in series with the battery 19 (both located outside of the cryogenic bath 16) and the field coil 17 (located within the bath 16).

The novel principle described above may also be utilized to provide a variable tuning superconducting inductor (see FIG. 3) and capacitor (see FIG. 6).

Figure 4:
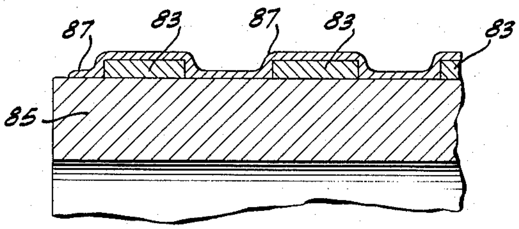
FIG. 4 is a sectional view of a portion of the device of FIG. 3.
Figure 3:
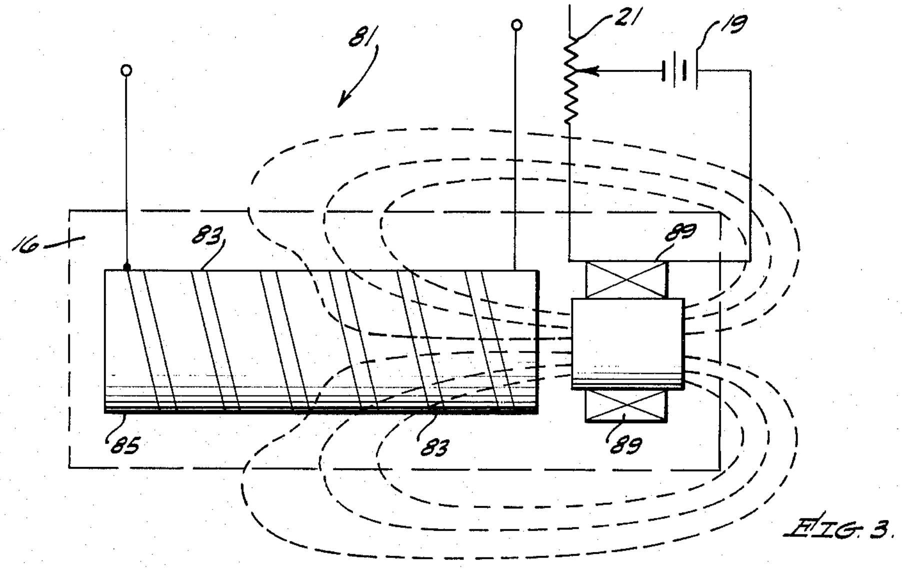
FIG. 3 illustrates an embodiment of a variable inductor according to the present invention.

A high Q variable tuning inductor 81 shown in FIG. 3 is constructed in accordance with the present invention without the use of mechanical moving parts by utilizing a material which remains superconducting at relatively high magnetic fields, such as niobium-zirconium alloy. This material is deposited as a coil 83 on a cylindrical form 85 and, in continuous ohmic contact with it, a continuous cylindrical thin-film "superconducting resistor" 87 (seen in FIG. 4) whose resistivity is high in the normal state is deposited as an overlay. The overlying thin-film resistor 87 must be of a material which has a low critical field, such as lead, tantalum, or niobium. In addition, a magnetic field (shown as dashed lines in FIG. 3) symmetrical with the coil form 85 is provided by a magnet 89 which is of adjustable strength.

In operation, the current through the electromagnet 89 is adjusted (by resistor 21) so that the magnetic field intensity at *q*, for example, is at the critical value for the thin-film resistor 87. For all regions to the left of *q*, the film resistor 87 is superconducting and acts as a turn-to-turn short of the superconducting inductive coil winding 83 since the A.-C. impedance of the film 87 is negligible compared to that of the coil 83. In the region to the right of *q*, the film 87 is resistive and does not affect the current flow in the superconducting coil 83. By changing the magnetic field intensity, the equilibrium position may be moved back and forth shorting more or less turns and thus varying the inductance.

Figure 5:
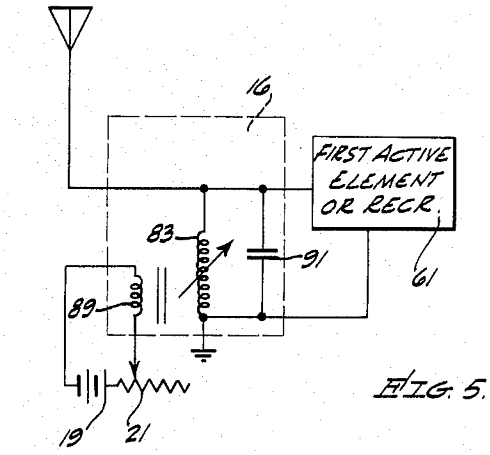
FIG. 5 is a schematic diagram of a radio receiver RF section or front end using the variable inductor shown in FIG. 3.

Such an inductance may be used as a variable tuning element in a radio receiver front end, for example, when combined with a fixed superconducting capacitor 91 as shown in FIG. 5. All tuning is achieved electronically, utilizing the intensity of a magnetic field to obtain a smooth, continuous control.

Furthermore, a variable tuning cryogenic capacitor of high Q properties having no mechanical moving parts is provided through use of cryogenic superconduction principles similar to those described above.

With reference to FIG. 6, a tunable capacitor 101 is shown having thin films 103 and 105 of superconducting material applied to the outer and inner surfaces, respectively, of a cylindrical dielectric separator 107. The superconducting films 103 and 105 are chosen to be highly resistive in the normal state. The external magnet 89 may be similar to the one shown in connection with the tunable inductor 81 (FIG. 3) and is shown located at one end of the capacitor 101 so that the portion A near the magnet can be driven to the normal state as was discussed in the case of the tunable inductor 81.

With a portion A of the capacitor 101 now having a large resistance associated with it, the RC time constant for that portion will be large compared to the remaining superconducting portion B of the capacitor 101. This effectively removes the resistive portion A of the capacitor from the rest of the capacitor for frequencies above that corresponding to the RC time constant.

From the foregoing it will be seen that the invention provides an improved high Q, superconducting variable impedance element which does not require special apparatus to prevent freezing since there are no moving parts. Also, the device described does not have large thermal paths extending outside the cryogenic system and thus the cryogenic environment can be efficiently maintained.

In practicing this invention, any material may be employed exhibiting the superconducting characteristics described above, and the invention is not limited to only the materials specifically described.

Although several specific embodiments have been herein illustrated, it will be appreciated that other organizations of the specific arrangements shown may be made within the spirit and scope of the invention. For example, the superconductive variable inductor may be of a parallel line configuration instead of the helical coil shown in FIG. 3. Also, the cylindrical configuration shown for the superconductive variable capacitor of FIG. 6 may be changed to a flat parallel plate configuration. Additionally, other components or elements may be substituted for those which have been particularly named.

Accordingly, it is intended that the foregoing disclosure and the showings made in the drawings shall be considered only as illustrations of the principles of this invention and are not to be construed in a limiting sense.

What is claimed is:

1. A variable impedance element for operation at cryogenic temperatures, comprising: a superconductive material exhibiting a significant resistance value at a temperature below a critical temperature only in the presence of a magnetic field in excess of a critical value; cryogenic means for maintaining the temperature of said material below said critical temperature; and means for varying the impedance of said element, said means comprising means for selectively applying to predetermined regions of said material a magnetic field having a magnitude in excess of said critical value.

2. A variable impedance element for operation at cryogenic temperatures, comprising: an insulated substrate; a superconductive material disposed on said substrate, said material exhibiting a significant resistance value at a temperature below a critical temperature only in the presence of a magnetic field in excess of a critical value; cryogenic means for maintaining the temperature of said material below said critical temperature; and adjustable magnetic field producing means coupled to said material for selectively applying to predetermined regions of said material a magnetic field strength in excess of said critical value to effect progressive changes in the impedance of said element.

3. A variable resistance element for operation at cryogenic temperatures, comprising: an elongated insulated substrate having a longitudinal axis; a superconductive material disposed on said substrate, said material exhibiting a significant resistance value at a temperature below a critical temperature only when coupled with a magnetic field in excess of a critical value; means for maintaining the temperature of said material below said critical temperature; and adjustable magnetic field producing means coupled to said material for selectively applying to predetermined regions of said material along said axis a magnetic field strength in excess of said critical value to effect progressive changes in the resistance of said element.

4. A variable resistance element for operation at cryogenic temperatures, comprising: an insulated rod having a longitudinal axis; a superconductive material disposed on said rod, said material exhibiting a significant resistance value at a temperature below a critical temperature only when coupled with a magnetic field in excess of a critical value; means including a cryogenic bath of liquid helium for maintaining the temperature of said material below said critical temperature; and adjustable magnetic field producing means including a tapered electromagnet disposed around and magnetically coupled to said material for providing in said material a magnetic field in excess of said critical value over a length of said material along said axis dependent upon the strength of said field to effect a desired change in the resistance of said element.

5. A variable inductance element for operation at cryogenic temperatures, comprising: an insulated substrate; a superconductive material disposed on said substrate to form an inductor, said material exhibiting essentially no resistance at a temperature below a critical temperature when coupled with a magnetic field below a critical value; a superconductive layer disposed on said superconductive material and in continuous ohmic contact therewith, said layer exhibiting a significant resistance value at a temperature below said critical temperature only when coupled with a magnetic field in excess of a critical value, said layer having a lower critical field value than said critical value of said superconductive material; means for maintaining the temperature of said element below said critical temperatures; and adjustable magnetic field producing means coupled to said layer for providing in said layer a magnetic field strength in excess of the critical value thereof but less than the critical field value of said superconductive material dependent upon said field strength to effect a desired change in the inductance of said element.

6. A variable inductance element for operation at cryogenic temperatures, comprising: an elongated insulated substrate having a generally circular cross section and a longitudinal axis; a superconductive material disposed on said substrate to form an induction coil, said coil exhibiting essentially no resistance at a temperature below a critical temperature when coupled with a magnetic field below a critical value; a superconductive layer disposed on the superconductive coil and in continuous ohmic contact therewith, said superconductive layer exhibiting a significant resistance value at a temperature below said critical temperature only when coupled with a magnetic field in excess of a critical value, said layer having a lower critical field value than said critical value of the coil material; means for maintaining the temperature of said superconductive coil and layer below respective critical temperatures; and adjustable magnetic field producing means coupled to said superconductive layer for providing in said layer a magnetic field strength in excess of the critical value of said layer but less than the critical value of said material over the length of said layer along said axis dependent upon said field strength to effect a desired change in the inductance of said element.

7. A variable capacitance element for operation at cryogenic temperatures, comprising: an insulated substrate; first and second superconductive layers disposed on said substrate to form a capacitor, said layers exhibiting a significant resistance value at a temperature below a critical temperature only when coupled with a magnetic field in excess of a critical value; means for maintaining the temperature of said layers below said critical temperature; and adjustable magnetic field producing means coupled to said layers for providing in said layers a magnetic field strength in excess of said critical value over an area of said layers dependent upon said field strength to effect a change in the capacitance of said element.

8. A variable capacitance element for operation at cryogenic temperatures, comprising: an insulated cylindrical substrate having an inner and outer surface and having a longitudinal axis; first and second superconductive layers disposed on said inner and outer surfaces, respectively, to form a cylindrical capacitor, said layers exhibiting a significant resistance value at a temperature below a critical temperature only when coupled with a magnetic field in excess of a critical value; means for maintaining the temperature of said layers below said critical temperature; and adjustable magnetic field producing means coupled to said layers for providing in said layers a magnetic field strength in excess of said critical value over a length of said layers along said axis dependent upon said field strength to effect a desired change in the capacitance of said element.

References Cited by the Examiner

UNITED STATES PATENTS

| | | | |
|---|---|---|---|
| 2,989,714 | 6/1961 | Park et al. | 338—32 |
| 3,054,978 | 9/1962 | Schmidlin et al. | 338—32 |
| 3,156,850 | 11/1964 | Walters. | |

BERNARD A. GILHEANY, *Primary Examiner.*

G. HARRIS, Jr., *Assistant Examiner.*